United States Patent
Wang et al.

(10) Patent No.: US 12,456,289 B2
(45) Date of Patent: Oct. 28, 2025

(54) METHOD FOR FEATURE DETECTION OF COMPLEX DEFECTS BASED ON MULTIMODAL DATA

(71) Applicant: Nanjing University of Aeronautics and Astronautics, Nanjing (CN)

(72) Inventors: Jun Wang, Nanjing (CN); Yuxiang Wu, Nanjing (CN); Dawei Li, Nanjing (CN); Yuan Zhang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 332 days.

(21) Appl. No.: 17/972,942

(22) Filed: Oct. 25, 2022

(65) Prior Publication Data

US 2023/0316736 A1    Oct. 5, 2023

(30) Foreign Application Priority Data

Mar. 16, 2022   (CN) .......................... 202210256372.5

(51) Int. Cl.
*G06V 10/80* (2022.01)
*G06V 10/774* (2022.01)
*G06V 10/82* (2022.01)

(52) U.S. Cl.
CPC .......... *G06V 10/806* (2022.01); *G06V 10/774* (2022.01); *G06V 10/82* (2022.01)

(58) Field of Classification Search
None
See application file for complete search history.

(56) References Cited

U.S. PATENT DOCUMENTS

2024/0221950 A1*   7/2024   Kollada ............... A61B 5/0205

* cited by examiner

*Primary Examiner* — Leon Flores

(57) ABSTRACT

The present disclosure disclose a method for feature detection of complex defects based on multimodal data, including feature extraction of multimodal data, multimodal feature cross-guided learning, multimodal feature fusion, and defect classification and regression. Feature extraction networks for multimodal two-dimensional data are constructed first, and a defect data set is sent to the networks for training; during training, cross-guided learning is implemented by using a multimodal feature cross-guidance network; then feature fusion is performed by using a weight adaptive method; and finally a defect detection task is implemented by using a classification subnetwork and a regression subnetwork. In the present disclosure, fusion of the multimodal data in a process of feature detection of the complex defects can be implemented efficiently, a capability of detecting the complex defects in an industrial environment can be improved more effectively, and production efficiency in an industrial manufacturing process is ensured.

4 Claims, 4 Drawing Sheets

METHOD FOR FEATURE DETECTION OF COMPLEX DEFECTS BASED ON MULTIMODAL DATA

CROSS REFERENCE TO RELATED APPLICATION

This patent application claims the benefit and priority of Chinese Patent Application No. 202210256372.5, filed on Mar. 16, 2022, the disclosure of which is incorporated by reference herein in its entirety as part of the present application.

TECHNICAL FIELD

The present disclosure relates to the field of computer vision technologies, and in particular, to a method for feature detection of complex defects based on multimodal data.

BACKGROUND ART

With rapid development of computer vision based on deep learning, application of object detection methods based on deep learning in industrial defect detection in the industry is becoming increasingly deeper and more extensive. Currently, sufficient solutions have been put forward for visual defects in most scenarios in the industry. In addition, in view of some complex defects on which multimodal data can be acquired by multiple sensors, a computer is generally used to process and fuse different data, and then defect detection is performed. This image fusion method features redundancy and complementarity, which can overcome limitations of an original image in terms of resolution, physical attributes, amount of information, and the like, and can further suppress noise and enhance aggregation of image information. Finally, precision of detection of complex defects with multimodal data in an industrial scenario can be greatly improved.

However, current image data fusion methods have a complex calculation process, making it difficult to apply the methods to industrial inspection in a pipeline state, and have a poor fusion effect, so that features of complex defects cannot be detected in a subsequent process. Therefore, a method for fusion detection of multimodal data for complex defects is urgently needed.

SUMMARY

(I) Technical Problems to be Solved

The present disclosure provides a method for feature detection of complex defects based on guided learning and an adaptive fusion mechanism of multimodal data, so as to solve the problem in the prior art that multimodal defect data cannot be accurately and efficiently detected.

(II) Technical Solutions

To achieve the foregoing objective, the present disclosure provides the following technical solutions: A method for feature detection of complex defects based on multimodal data specifically includes the following steps:
step S1: constructing feature extraction networks;
step S2: inputting multimodal training data into the feature extraction networks for parallel learning of multimodal features;
step S3: constructing a multimodal feature cross-guidance network, and establishing a local connection between parallel multimodal data extraction networks to form a multimodal feature cross-guidance mechanism;
step S4: performing multimodal adaptive fusion by using weights; and
step S5: implementing defect detection by using a classification subnetwork and a regression subnetwork.

Further, step S1 specifically includes: constructing a plurality of parallel feature extraction networks by using a convolutional neural network, which correspond to extraction of data of multiple modals respectively, where each of the parallel feature extraction networks includes six layers, which include different convolutional layers, pooling layers, dense block structures, and dilated bottleneck layer structures.

Further, step S2 specifically includes: dividing an industrial defect multimodal data set into a training set and a test set, and inputting the training set into the parallel feature extraction networks first for feature extraction.

Further, step S3 specifically includes: establishing a local connection between the feature extraction networks in a first stage, a third stage, and a fifth stage by using a 1×1 convolutional layer, merging features of a same stage first, and finally superimposing the merged features on each parallel feature extraction network as a whole through the 1×1 convolutional layer, to implement cross guidance of multimodal features, and establish a feature flow mechanism of different modal data in feature extraction.

Further, step S4 specifically includes: establishing interdependence between feature channels of each parallel feature extraction network, automatically acquiring an importance degree of each feature channel by using a learning method, and then promoting useful features and suppressing features of little use in a current task based on the importance degree.

Further, step S5 specifically includes: constructing a classification subnetwork and a regression subnetwork by using two fully convolutional networks and a distribution of feature pyramid network structures, and sending fused feature information into the two subnetworks for defect classification and location.

(III) Beneficial Effects

In the present disclosure, fusion of the multimodal data in a process of feature detection of the complex defects can be implemented efficiently, a capability of detecting the complex defects in an industrial environment can be improved more effectively, and production efficiency in an industrial manufacturing process is ensured.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and a person of ordinary skill in the art can further derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art on the basis of the embodiments of the present disclosure without creative efforts shall fall within the protection scope of the present disclosure.

Figure 1:
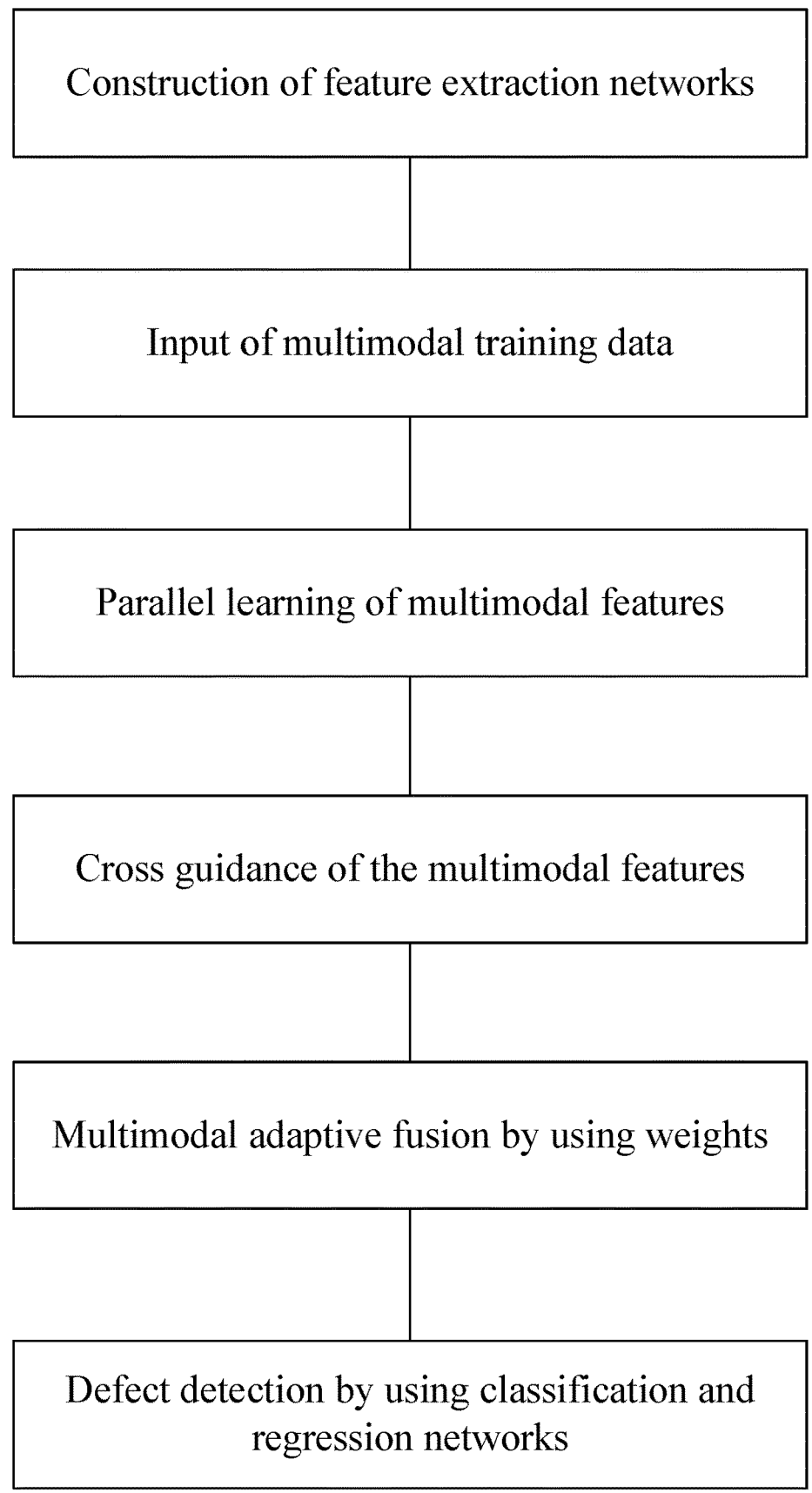
FIG. 1 is an overall flowchart according to Embodiment 1 of the present disclosure.

Referring to FIGS. 1-4, preferred Embodiment 1 of the present disclosure provides a method for feature detection of complex defects based on guided learning and an adaptive fusion mechanism of multimodal data. In specific implementation, the method can be directly applied to various industrial defect detection devices based on multimodal two-dimensional data acquired by multiple sensors. Specifically, FIG. 1 shows an overall flowchart of the method. As shown in FIG. 1, the method includes the following steps.

Figure 2:
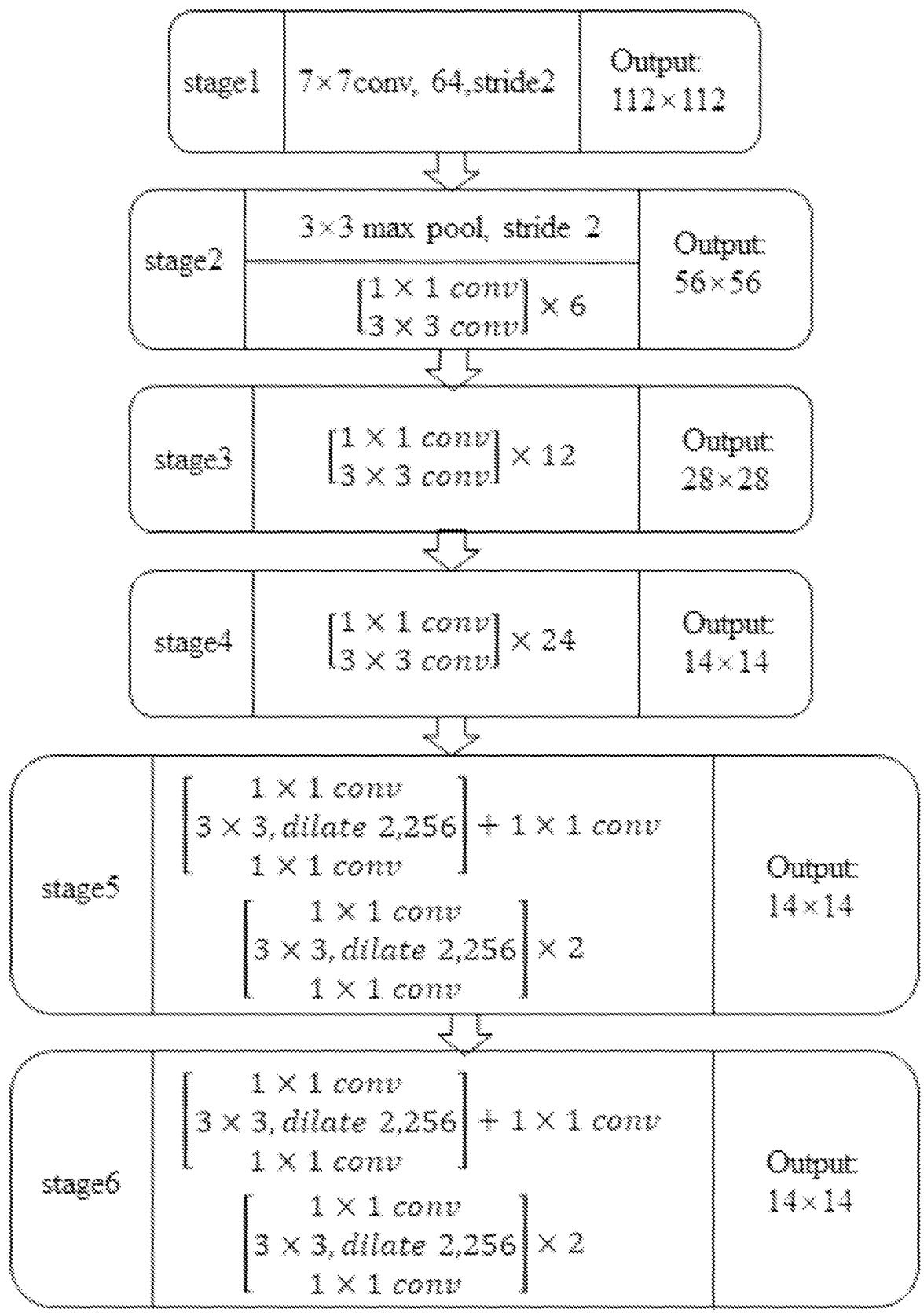
FIG. 2 is a structural diagram of constructed feature extraction networks based on a convolutional neural network according to Embodiment 1 of the present disclosure.

First, a plurality of feature extraction networks based on a convolutional neural network are established to implement feature extraction of multimodal two-dimensional data. Specifically, the structure of the feature extraction network based on the convolutional neural network is shown in FIG. 2.

Specifically, the network structure is divided into six layers, including different dense connection structures, convolutional layers, and bottleneck layer structures.

The first layer includes a convolutional layer with a 7×7 convolution kernel.

The second layer includes a 3×3 maximum pooling layer and a dense connection structure, and the dense connection structure includes alternating 1×1 convolutional layers and 3×3 convolutional layers.

The third layer and the fourth layer include two layers of dense connection structure different in structure, and each of the dense connection structures includes alternating 1×1 convolutional layers and 3×3 convolutional layers.

The fifth layer and the sixth layer have the same structure, including two dilated bottleneck layer structures and a dilated bottleneck layer structure with a 1×1 convolutional layer in parallel. The specific structure is shown in FIG. 2.

A corresponding multimodal industrial defect data set is constructed and divided into a training set and a test set.

Then, training is performed based on the foregoing feature extraction networks and the data set.

Figure 3:
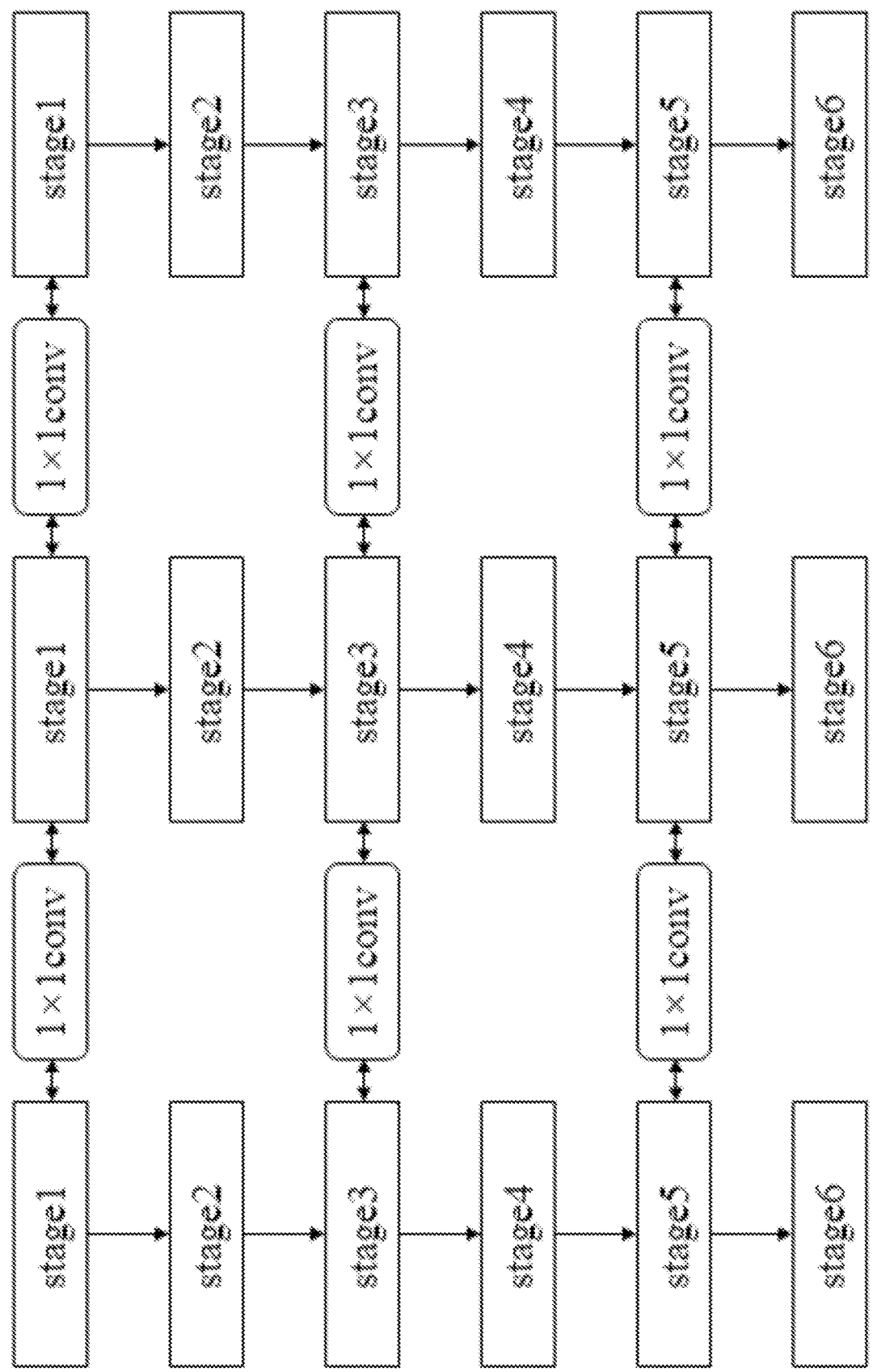
FIG. 3 is a schematic diagram of guided learning of multimodal features according to Embodiment 1 of the present disclosure.

In addition, cross guidance of multimodal feature is performed based on the foregoing established feature extraction networks based on the convolutional neural network. Specifically, this multimodal feature cross-guidance structure is shown in FIG. 3, and vertical arrows indicate a global feature learning flow in the feature extraction networks, which is a top-down path. In this process, a shallow layer shows a rough contour feature. With deepening of the networks, detailed information is gradually lost, and deep convolutional layers output semantic information. Horizontal arrows indicate that a local connection is established between a plurality of parallel feature extraction networks in a first stage, a third stage, and a fifth stage through a 1×1 convolutional layer, and features in these stages are merged and then superimposed on each of the parallel feature extraction networks through the 1×1 convolutional layer, which implements cross guidance of multimodal features, implements flow of different modal data between the parallel feature extraction networks, and improves training efficiency.

Figure 4:
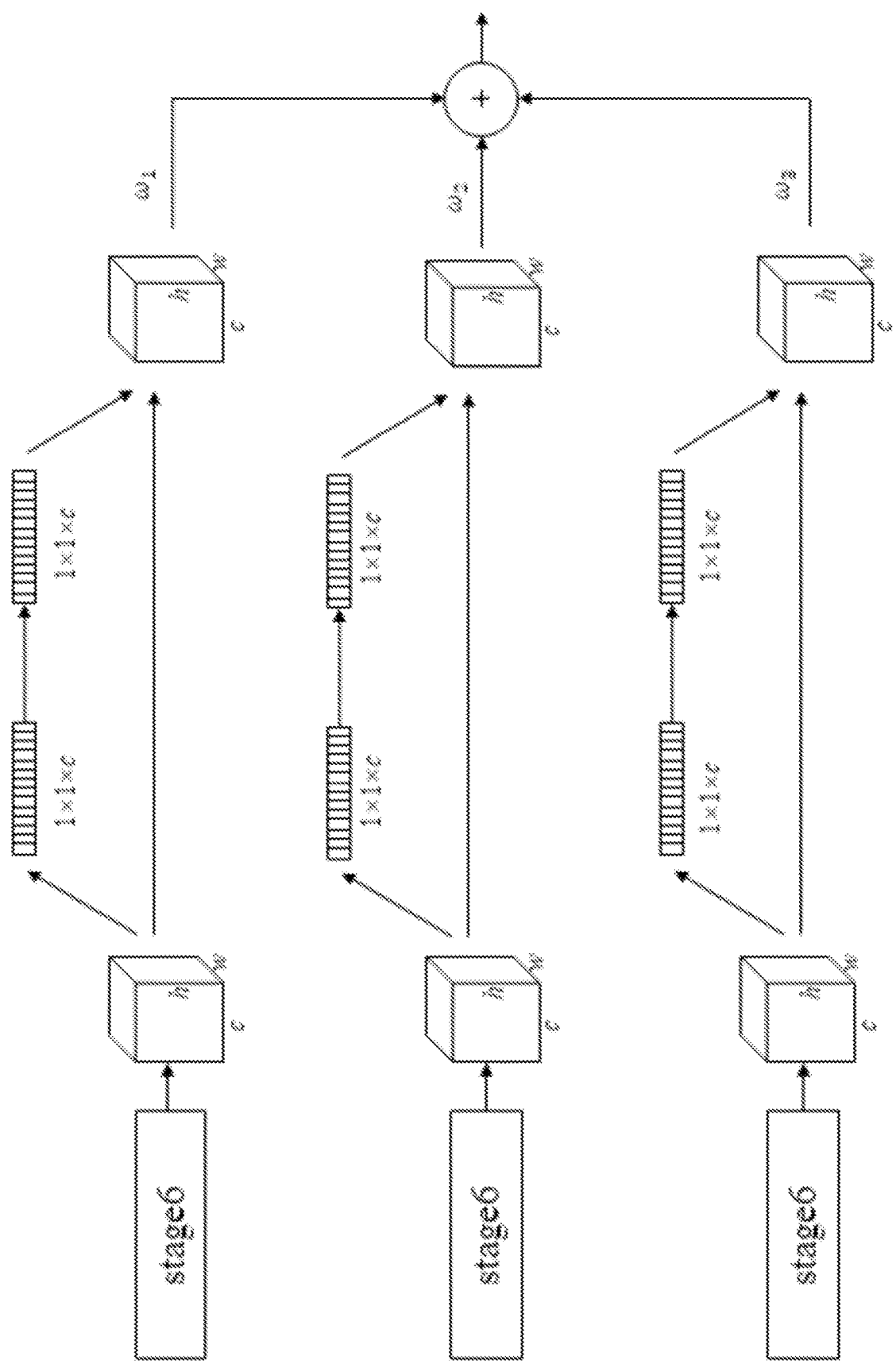
FIG. 4 is a schematic diagram of adaptive fusion by using weights according to Embodiment 1 of the present disclosure.

Then, multimodal feature fusion is performed. To solve the imbalance problem of multimodal feature fusion, learnable weights are introduced for multimodal features first. Specifically, as shown in FIG. 4, a feature graph C×W×H output by each feature extraction network undergoes global mean-pooling, then a feature graph with a size of 1×1×C is obtained, and then a weight matrix $\omega_i$ of the feature graph is obtained through two fully connected neural networks. Then, multi-channel multimodal data features are fused in a weighted manner by using the obtained weights. Therefore, a method for adaptive multimodal fusion by using weights is proposed $$o = \sum_i \frac{\omega_i}{\varepsilon + \sum_j \omega_j} \cdot I_i$$

A Relu function is used for learning weights to ensure that $\omega_i$ is greater than or equal to 0, $\varepsilon=0.0001$ is a value for avoiding numerical instability, $I_i$ represents multimodal feature information to be fused, and 0 represents fused global feature information. Similarly, the value of each normalized weight also falls between 0 and 1.

Furthermore, the feature information obtained after feature fusion is sent to a classification subnetwork and a regression subnetwork to predict defect target bounding boxes. The classification subnetwork predicts a probability of an object occurring at each spatial location for each bounding box and object category. This subnetwork is implemented by connecting a small fully convolutional network to each feature pyramid network level. Parameters of this subnetwork are shared at all levels. The regression subnetwork is parallel to the classification subnetwork, and another fully convolutional network is attached to each pyramid network level, so that an offset of each bounding box returns to the vicinity of ground truth. ground truth represents manually marked defect detection data.

Various aspects of the present disclosure are described with reference to the accompanying drawings in the present disclosure, and the accompanying drawings show many illustrated embodiments. However, the embodiments of the present disclosure are not necessarily defined to include all aspects of the present disclosure. It should be understood that the various concepts and embodiments described above and the concepts and implementations described in more detail below may be implemented in any of many ways, because the disclosed concepts and embodiments of the present disclosure are not limited to any implementation. In addition, some disclosed aspects of the present disclosure may be used alone or in any appropriate combination with other disclosed aspects of the present disclosure.

The preferred embodiments of the present disclosure disclosed above are only used to help illustrate the present disclosure. The preferred embodiments neither describe all the details in detail, nor limit specific implementations of the present disclosure. Obviously, many modifications and changes may be made based on the content of the present specification. In the present specification, these embodiments are selected and specifically described to better explain the principle and practical application of the present disclosure, so that a person skilled in the art can well understand and use the present disclosure. The present disclosure is only limited by the claims and a full scope and equivalents thereof.

What is claimed is:

1. A method for feature detection of complex defects based on multimodal data, specifically comprising the following steps:
    step S1: constructing a plurality of parallel feature extraction networks;
    step S2: inputting multimodal training data into the plurality of parallel feature extraction networks for parallel learning of multimodal features;
    step S3: according to the multimodal features, constructing a multimodal feature cross-guidance network, and establishing a local connection between the plurality of parallel feature extraction networks to form a multimodal feature cross-guidance mechanism;
    step S4: based on the plurality of parallel feature extraction networks, performing multimodal adaptive fusion by using weights to obtain a feature information; and
    step S5: based on the feature information, implementing defect detection by using a classification subnetwork and a regression subnetwork;
    wherein step S1 specifically comprises: constructing the plurality of parallel feature extraction networks by using a convolutional neural network, which correspond to extraction of data of multiple modals respectively, wherein each of the parallel feature extraction networks comprises six layers, which comprise different convolutional layers, pooling layers, dense block structures, and dilated bottleneck layer structures; and
    step S3 specifically comprises: establishing a local connection between the plurality of parallel feature extraction networks in a first stage, a third stage, and a fifth stage by using a 1×1 convolutional layer, merging features of a same stage first, and finally superimposing the merged features on each parallel feature extraction network as a whole through the 1×1 convolutional layer, to implement cross guidance of multimodal features, and establish a feature flow mechanism of different modal data in feature extraction.

2. The method for feature detection of complex defects based on multimodal data according to claim 1, wherein step S2 specifically comprises: dividing an industrial defect multimodal data set into a training set and a test set, and inputting the training set into the parallel feature extraction networks first for feature extraction.

3. The method for feature detection of complex defects based on multimodal data according to claim 1, wherein step S4 specifically comprises: establishing interdependence between feature channels of each parallel feature extraction network, automatically acquiring an importance degree of each feature channel by using a learning method, and then promoting useful features and suppressing features of little use in a current task based on the importance degree.

4. The method for feature detection of complex defects based on multimodal data according to claim 1, wherein step S5 specifically comprises: constructing the classification subnetwork and the regression subnetwork by using two fully convolutional networks and a distribution of feature pyramid network structures, and sending the feature information into the two subnetworks for defect classification and location.

* * * * *